United States Patent Office 3,442,867
Patented May 6, 1969

3,442,867
PROCESS FOR POLYMERIZING CYCLIC ETHERS AND CYCLIC ACETALS WITH AN ARSENIC-CONTAINING CATALYST
Herbert May, Tudor City Place, N.Y., Brian John Kendall-Smith, Northfield, Birmingham, John Alan Dodd, West Bromwich, and Alan Thomas Instone, Tipton, England, assignors to British Industrial Plastics Limited, London, England, a corporation of the United Kingdom
No Drawing. Filed Nov. 21, 1966, Ser. No. 595,626
Claims priority, application Great Britain, Nov. 23, 1965, 49,655/65
Int. Cl. C08g 1/20, 23/14
U.S. Cl. 260—67    14 Claims

ABSTRACT OF THE DISCLOSURE

A process for preparing high molecular weight homopolymers and copolymers suitable for moulding, by polymerising cyclic ethers or cyclic acetals in the presence of arsenic pentafluoride and its complexes.

---

This invention is concerned with high molecular weight polymers, and especially relates to a process for the polymerisation of cyclic ethers, i.e., compounds having a ring system wherein there is contained at least one —C—O—C— grouping, and of cyclic acetals, i.e., compounds having a ring system wherein there is contained at least one —O—C—O— grouping.

According to the present invention a process for preparing a high molecular weight polymer comprises effecting the polymerisation of a cyclic ether or cyclic acetal in the presence of a catalytic amount of arsenic pentafluoride or a coordination complex of arsenic pentafluoride.

The term "polymerisation" as used herein is intended to include homopolymerisation of any one of the cyclic ethers or cyclic acetals, copolymerisation of two or more of the cyclic ethers or cyclic acetals, and copolymerisation of the cyclic ethers or cyclic acetals with one or more other copolymerisable compounds.

Typical cyclic ethers and acetals which may be polymerised according to the invention include trioxan, tetroxan, 1,3-dioxolan, tetrahydrofuran, 3,3-bis(chloromethyl)oxacyclobutane, styrene oxide, propylene oxide, 1,3,5-trioxepan, 1,3-dioxepan, and ethylene oxide. They may be copolymerised with each other and with such other polymerisable compounds as styrene and styrene derivatives, aldehydes, allyl compounds, cyclic esters, unsaturated aliphatic hydrocarbons, vinyl ethers and esters, and N-vinyl and C-vinyl heterocyclic compounds. Suitable such copolymerisable compounds include styrene, α-methyl styrene, α-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ether, allyl bromide, allyl methacrylate, allyl cellosolve, allyl cyanide, allyl benzene, allyl glycyl ether, allyl alcohol, allyl beta-cyclohexyl propionate, allyl phenyl ether, diallyl phosphate; beta-propiolactone, delta-valerolactone, epsiloncaprolactone; trichlorethylidene lactate, methylene glycollate, lactide, ethylene oxalate, dioxanone; isobutene, butadiene, isoprene, pentadiene-1,3, cyclohexene, heptene-1, octene-1, cyclo-pentadiene, 4-vinyl cyclohexene, beta-pimene, bicyclo[2,2,1]hept-2-ene, bicyclo[2,2,1]hepta-2,5-diene; methyl vinyl ether, ethyl vinyl ether, n-butyl vinyl ether, isobutyl vinyl ether, vinyl 2-ethyl hexyl ether, phenyl vinyl ether; vinyl acetate; N-vinyl carbazole, 2-vinyl pyridine, and 2-vinyl-1,3-dioxan. Normally these other comonomers will be reacted in amounts between 0.01 and 50%, based on the total weight of reactants, preferably between 0.1 and 20%.

Suitable catalysts include arsenic pentafluoride and its coordination complexes with (a) organic compounds in which the donor atom is oxygen or sulphur, (b) weakly basic amines, (c) alkyl cyanides, and (d) alkyl, aralkyl and aryl halides. Particularly there may be mentioned its complexes with alcohols, phenols, acids, ethers, acid anhydrides, ketones, esters, aldehydes, dialkyl sulphides and mercaptans.

More specifically there may be mentioned the complexes of arsenic pentafluoride with methanol, ethanol, propanol, butanol, triphenyl methyl alcohol, methyl acetate, butyl acetate, phenyl acetate, benzoic acid, acetic acid, acetic anhydride, acetone, methyl ethyl ketone, dimethyl ether, diethyl ether, methyl phenyl ether, phenol, acetaldehyde, dimethyl sulphide, diethyl sulphide and ethyl mercaptan.

Other catalysts include the complexes of arsenic pentafluoride with methyl cyanide and ethyl cyanide, and with triphenylamine, and the complexes with halogenated paraffins such as 1,1,2-trichloro-1,2,2-trifluoroethane.

The process is preferably carried out with the minimum of moisture and suitably under anhydrous conditions. It may be conducted under bulk conditions or it may be of advantage to conduct the polymerisation in an inert liquid medium which may be a solvent or nonsolvent for the monomers under the polymerisation conditions. Suitable solvents include saturated aliphatic and cycloaliphatic hydrocarbons, and aliphatic and aromatic nitro hydrocarbons. Cyclohexane is particularly suitable. It is often desirable to mix the monomer, or in the case of copolymerisation the comonomers, with an inert liquid medium and then to add the catalyst in solution in the same or a different inert medium. For instance, the comonomers trioxan and styrene may be mixed in cyclohexane, and the catalyst may be added in a solvent such as nitropropane or nitroethane.

The temperature of the reaction is preferably between 0° C. and 100° C. depending on the reactants, solvent and so on, and the reaction may, if desired, be carried out under a dry inert atmosphere, such as carbon dioxide or nitrogen. In some cases, it is suitable to use superatmospheric pressure.

The catalysts of the present invention can readily be removed from the formed polymer by suitable procedures, such as washing, milling, or agitating the polymer with solvents or neutralising agents for the catalysts. It is particularly effective to remove the catalyst by treatment with a basic substance such as an amine or ammonia. The polymer is then thoroughly washed after such treatment to remove all residues, and dried.

There may be incorporated into the polymers formed by the process of the invention any of the stabilizers, antioxidants, pigments, ultra-violet light absorbers and similar materials commonly used as additives with high molecular weight oxymethylene polymers. The polymers may also, if desired, be stabilized by treating them with compounds which react with any free end group. For instance, they may be acetylated at the end-groups by reaction with acetic acid or acetic anhydride.

Polymers produced in accordance with the process of this invention are particularly useful for injection, compression and extrusion moulding.

The following examples are given for the purpose of illustrating the invention. In these Examples the inherent viscosity has been determined at 60° C. on a 0.5% solution of the polymer in p-chlorophenol containing 2% alpha-pinene as stabiliser. The $K_{222}$ value (rate of loss of weight at 222° C.) was measured by the method described by Schweitzer, Macdonald and Punderson in the Journal of Applied Polymer Science 1959, 1, 160.

EXAMPLE 1

A reaction vessel was charged with 150 g. trioxan (freshly distilled from stearylamine and calcium hyride) and 150 g. cyclohexane (dried by passing through an Amberlite IR–120 ion exchange column). The solution was maintained at 60° C. in an atmosphere of dry air and was vigorously agitated whilst 6 ml. arsenic pentafluoride gas was injected below the surface of the solution. The reaction was allowed to proceed for 2½ hrs., after which the reaction product was filtered, washed with acetone, homogenised with 100 ml. acetone by high speed agitation, filtered and washed with 200 ml. of distilled water. The polymer was then treated with 400 ml. 3% ammonia solution at 85° C. for 5 mins., filtered, washed with 200 ml. distilled water, homogenised with acetone as before and finally dried in a vacuum oven at 50° C. The yield of polymer was 15 g. (10%).

EXAMPLE 2

Example 1 was repeated with the exception that 4.5 ml. (3%) styrene were added to the reaction mixture and 7.0 ml. arsenic pentafluoride gas were used. The yield of copolymer was 19 g. (13%).

EXAMPLE 3

Example 2 was repeated with the exception that the reaction was catalysed by 0.022 g. methyl cyanide-arsenic pentafluoride complex (used as a 1% solution in nitropropane). The yield of copolymer was 37.5 g. (25%) and it possessed a $K_{222}$ value of 0.76.

EXAMPLE 4

Example 2 was again repeated with the exception that the reaction was catalysed by 0.13 g. diethyl sulphide-arsenic pentafluoride reaction product (used as a 1% solution in nitropropane). The copolymer possessed a $K_{222}$ value of 0.46.

EXAMPLE 5

A reaction vessel was charged with 100 g. trioxan, 100 g. cyclohexane (both purified as in Example 1) and 3 g. dioxolan. The solution was maintained at 60° C. with vigorous agitation in an atmosphere of dry air and 0.006 g. arsenic pentafluoride-diethyl etherate was added as a dilute solution in a mixture of nitropropane and cyclohexane. The reaction was allowed to proceed for 3 hours and the copolymer then recovered as in the preceeding examples. The yield of copolymer was 44%, and its inherent viscosity 1.03.

EXAMPLE 6

A reaction vessel was charged with 150 g. trioxan and 150 g. cyclohexane (both purified as in Example 1). The solution was maintained at 60° C. with vigorous agitation and 0.72 g. arsenic pentafluoride-methyl cyanide complex was added as a dilute solution in a mixture of nitropropane and cyclohexane. The solution became cloudy in ½ minute and reaction continued steadily for 2½ hours, when it was stopped by addition of acetone. The polymer was recovered as in the proceding examples. The white polymer has an inherent viscosity of 1.19.

What is claimed is:

1. A process for the preparation of a high molecular weight polymer consisting essentially in effecting the polymerization of a cyclic ether which is trioxan, tetroxan, 1,3-dioxolan, tetrahydrofuran, 3,3-bis(chloromethyl)oxacyclobutane, styrene oxide, propylene oxide, 1,3,5-trioxepan, 1,3-dioxepan or ethylene oxide in the presence of a catalytic amount of
   (a) arsenic pentafluoride;
   (b) a coordination complex of arsenic pentafluoride with an organic compound in which the donor atom is oxygen or sulphur;
   (c) a coordination complex of arsenic pentafluoride with a weakly basic amine;
   (d) a coordination complex of arsenic pentafluoride with an alkyl cyanide; or
   (e) a coordination complex of arsenic pentafluoride with an alkyl, halide.

2. A process according to claim 1 wherein trioxan is polymerised.

3. A process according to claim 1 wherein tetroxan, 1,3-dioxolan, tetrahydrofuran, 3,3-bis(chloromethyl)oxacyclobutane, styrene oxide, propylene oxide, 1,3,5-trioxepan, 1,3-dioxepan or ethylene oxide is polymerised.

4. A process according to claim 1 wherein the cyclic ether or cyclic acetal is reacted in an amount between 50 and 99.99% by weight, based on the total weight of reactants.

5. A process according to claim 1 wherein the catalyst is a complex of arsenic pentafluoride with an alcohol, a phenol, an acid, an ether, an acid anhydride, a ketone, an ester, an aldehyde, a dialkyl sulphide or a mercaptan.

6. A process according to claim 5 wherein the catalyst is a complex of arsenic pentafluoride with diethyl ether.

7. A process according to claim 5 wherein the catalyst is a complex of arsenic pentafluoride with diethyl sulphide.

8. A process according to claim 1 wherein the catalyst is a complex of arsenic pentafluoride with triphenylamine.

9. A process according to claim 1 wherein the catalyst is a complex of arsenic pentafluoride with methyl cyanide or ethyl cyanide.

10. A process according to claim 1 wherein the polymerisation is effected under anhydrous conditions.

11. A process according to claim 1 wherein the polymerisation is effected in the presence of an inert liquid medium.

12. A process according to claim 1 wherein the polymerisation is effected at a temperature between 0° and 100° C.

13. A process according to claim 1 wherein the cyclic ether is copolymerized with at least one of the following: styrene, α-methyl substituted styrenes, β-phenyl substituted styrenes, vinyl naphthalenes, an aldehyde, an allyl compound, a cyclic ester, an unsaturated aliphatic hydrocarbon having 4 to 10 carbon atoms, a vinyl ether, a vinyl ester, an N-vinyl heterocyclic compound or a C-vinyl heterocyclic compound.

14. A process according to claim 1, wherein the cyclic ether is copolymerized with at least one of the following: styrene, α-methyl styrene, α-phenyl styrene, o-methyl styrene, m-methyl styrene, p-methyl styrene, anethole, 1-vinyl naphthalene, 2-vinyl naphthalene, stilbene, indene, coumarone, acenaphthylene, anisaldehyde, an allyl compound, β-propiolactone, delta-valerolactone, epsilon-caprolactone, trichloroethylidene lactate, methylene glycollate, lactide, ethylene oxalte, dioxanone, isobutene, butadiene, isoprepen, pentadiene-1,3, cyclohexene, heptene-1, octene-1, cyclopentadiene, 4-vinyl cyclohexene, β-pinene, a vinyl ether, a vinyl ester, N-vinyl heterocyclic compound and C-vinyl heterocyclic compound.

References Cited

UNITED STATES PATENTS 3,219,631  11/1965  Kullmar et al. _____ 260—67

WILLIAM H. SHORT, *Primary Examiner.*

L. M. PHYNES, *Assistant Examiner.*

U.S. Cl. X.R.

260—2, 64, 67.5, 72, 73, 88.3